United States Patent
Cao et al.

(10) Patent No.: US 9,483,375 B2
(45) Date of Patent: *Nov. 1, 2016

(54) STREAMING OPERATOR WITH TRIGGER

(71) Applicant: International Business Machines Corporation, Armonk, NY (US)

(72) Inventors: Bin Cao, Rochester, MN (US); Jessica R. Eidem, Rochester, MN (US); Brian R. Muras, Rochester, MN (US); Jingdong Sun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 94 days.

This patent is subject to a terminal disclaimer.

(21) Appl. No.: 14/264,388

(22) Filed: Apr. 29, 2014

(65) Prior Publication Data

US 2015/0205627 A1    Jul. 23, 2015

Related U.S. Application Data

(63) Continuation of application No. 14/158,960, filed on Jan. 20, 2014.

(51) Int. Cl.
*G06F 11/30* (2006.01)
*G06F 9/455* (2006.01)
(Continued)

(52) U.S. Cl.
CPC ....... *G06F 11/3072* (2013.01); *G06F 9/45533* (2013.01); *G06F 9/5005* (2013.01); *G06F 17/30516* (2013.01); *H04L 41/0896* (2013.01)

(58) Field of Classification Search
CPC ...... G06F 9/50; G06F 9/5061; G06F 9/5066; G06F 9/5072; G06F 9/5077; G06F 9/45533; G06F 9/5005; G06F 9/5027; G06F 9/505; G06F 9/5083; G06F 9/5088; G06F 11/30; G06F 11/3003; G06F 11/3006; G06F 11/301; G06F 11/3037; G06F 11/3065; G06F 11/3072; G06F 11/3089; G06F 17/30516; G06F 17/30545; G06F 2201/84; H04L 41/08; H04L 41/0803; H04L 41/0806; H04L 41/0813; H04L 41/0816; H04L 43/00; H04L 43/04; H04L 43/08; H04L 43/12
USPC ............... 709/220, 221, 223, 224, 226, 231; 718/1
See application file for complete search history.

(56) References Cited

U.S. PATENT DOCUMENTS 8,069,190 B2    11/2011   McColl et al.
8,726,083 B1 *  5/2014    van der Goot ..... G06F 11/1438
                                                    714/15

(Continued)

OTHER PUBLICATIONS

Abadi et al., "The Design of the Borealis Stream Processing Engine," Proceedings of the 2005 CIDR Conference.
(Continued)

*Primary Examiner* — Vivek Srivastava
*Assistant Examiner* — William C McBeth
(74) *Attorney, Agent, or Firm* — Martin & Associates, LLC; Derek P. Martin

(57) ABSTRACT

One or more operators in a flow graph of a streaming application may include one or more triggers that indicate when action needs to be taken for the operator. A streams manager monitors performance of a streaming application and receives a notification when a trigger in an operator fires. In response to a trigger firing, the streams manager determines an appropriate action corresponding to the trigger. When the trigger indicates an adjustment of cloud resources are needed, the streams manager formulates a cloud resource request to a cloud manager. In response, the cloud manager adjusts the cloud resources for the operator to improve performance of the streaming application. A trigger may specify a trigger action for an operator, and may additionally specify a trigger action for one or more other affected operators. The firing of a trigger in one operator can therefore result in adjusting resources to multiple operators.

17 Claims, 9 Drawing Sheets

(51) Int. Cl.
*G06F 9/50* (2006.01)
*G06F 17/30* (2006.01)
*H04L 12/24* (2006.01)

(56) References Cited

U.S. PATENT DOCUMENTS

| | | |
|---|---|---|
| 2007/0299980 A1 | 12/2007 | Amini et al. |
| 2010/0030896 A1* | 2/2010 | Chandramouli .. G06F 17/30516 709/224 |
| 2011/0225582 A1* | 9/2011 | Iikura ................ G06F 11/1415 718/1 |
| 2012/0110042 A1 | 5/2012 | Barsness et al. |
| 2012/0179809 A1 | 7/2012 | Barsness et al. |
| 2012/0216014 A1* | 8/2012 | Branson ................ G06F 9/505 712/25 |
| 2012/0218268 A1* | 8/2012 | Accola ................ G06F 9/5027 345/440 |
| 2012/0311012 A1 | 12/2012 | Mazhar et al. |
| 2013/0047154 A1* | 2/2013 | Mehta ................ G06F 9/45558 718/1 |
| 2013/0080652 A1 | 3/2013 | Cradick et al. |
| 2013/0086418 A1* | 4/2013 | Sakurai ............... G06F 11/1412 714/15 |
| 2013/0179586 A1 | 7/2013 | Branson et al. |
| 2013/0198371 A1 | 8/2013 | Branson et al. |
| 2013/0290969 A1 | 10/2013 | Branson et al. |
| 2014/0007097 A1 | 1/2014 | Chin et al. |

OTHER PUBLICATIONS

Cervino et al., "Adaptive Provisioning of Stream Processing Systems in the Cloud," IEEE 28th International Conference on Data Engineering Workshops, Apr. 1-5, 2012, pp. 295-301.

Fernandez et al., "Integrating Scale Out and Fault Tolerance in Stream Processing using Operator State Management," Proceedings of the 2013 ACM SIGMOD International Conference on Management of Data, Jun. 2013, pp. 725-736.

Gulisano et al., "StreamCloud: An Elastic and Scalabe Data Streaming System," IEEE Transactions on Parallel and Distributed Systems, vol. 23, No. 12, Dec. 2012, pp. 2351-2365.

Lorido-Botran et al., "Auto-Scaling Techniques for Elastic Applications in Cloud Environments," Department of Computer Architecture and Technology, University of the Basque Country, Sep. 5, 2012.

Mao et al., "Auto-Scaling to Minimize Cost and Meet Application Deadlines in Cloud Workflows," 2011 International Conference for High Performance Computing, Networking, Storage and Analysis, Nov. 2011, pp. 1-12.

Yang et al., "Sonora: A Platform for Continuous Mobile-Cloud Computing," Technical Report. Microsoft Research Asia, 2012, pp. 1-17.

Urgaonkar et al., "Agile Dynamic Provisioning of Multi-Tier Internet Applications," ACM Transactions on Autonomous and Adaptive Systems, vol. 3, No. 1, Mar. 2008, pp. 1-39.

Kleiminger, Wilhelm, "Stream Processing in the Cloud", Imperial College of Science, Technology and Medicine, Jun. 2010.

Kleiminger et al, "Balancing Load in Stream Processing with the Cloud", 6th International Workshop on Self Managing Database System (SMDB), Apr. 2011.

Satzger et al., "Esc: Towards an Elastic Stream Computing Platform for the Cloud", 2011 IEEE 4th International Conference on Cloud Computing, p. 348-355, Jul. 2011.

Ishii et al., "Elastic Stream Computing with Clouds", 2011 IEEE 4th International Conference on Cloud Computing, p. 195-202, Jul. 2011.

Goswami et al., "Dynamic Provisioning and Resource Management for Multi-Tier Cloud Based Applications," Foundations of Computing and Decision Sciences, vol. 38, No. 3, 2013, pp. 175-191.

* cited by examiner

| Trigger Criteria | |
|---|---|
| Resource Utilization | 710 |
| Data Rate | 720 |
| Data Value | 730 |
| Data Type | 740 |
| Time-Based | 750 |
| Data Overflow | 760 |

| Trigger Actions | |
|---|---|
| Request Resource Adjustment | 810 |
| Request Resource Adjustment for Affected Operator(s) | 820 |
| Live Migration of Operator | 830 |
| Log Data | 840 |
| Signal Affected Operator | 850 |
| Validation | 860 |

STREAMING OPERATOR WITH TRIGGER

BACKGROUND

1. Technical Field

This disclosure generally relates to streaming applications, and more specifically relates to enhancing performance of a streaming application using cloud resources as the streaming application runs.

2. Background Art

Streaming applications are known in the art, and typically include multiple operators coupled together in a flow graph that process streaming data in near real-time. An operator typically takes in streaming data in the form of data tuples, operates on the tuples in some fashion, and outputs the processed tuples to the next operator. Streaming applications are becoming more common due to the high performance that can be achieved from near real-time processing of streaming data.

Many streaming applications require significant computer resources, such as processors and memory, to provide the desired near real-time processing of data. However, the workload of a streaming application can vary greatly over time. Allocating on a permanent basis computer resources to a streaming application that would assure the streaming application would always function as desired (i.e., during peak demand) would mean many of those resources would sit idle when the streaming application is processing a workload significantly less than its maximum. Furthermore, what constitutes peak demand at one point in time can be exceeded as the usage of the streaming application increases. For a dedicated system that runs a streaming application, an increase in demand may require a corresponding increase in hardware resources to meet that demand.

Cloud-based streaming is known in the art. Known systems for managing cloud-based streaming are administrative tools run by a human system administrator that allow the system administrator to adjust allocation of resources to address performance issues as they arise. This process is highly manual and relies on the expertise of a human, and is therefore time-consuming and error-prone.

BRIEF SUMMARY

One or more operators in a flow graph of a streaming application may include one or more triggers that indicate when action needs to be taken for the operator. A streams manager monitors performance of a streaming application and receives a notification when a trigger in an operator fires. In response to a trigger firing, the streams manager determines an appropriate action corresponding to the trigger. When the trigger indicates an adjustment of cloud resources are needed, the streams manager formulates a cloud resource request to a cloud manager. In response, the cloud manager adjusts the cloud resources for the operator to improve performance of the streaming application. A trigger may specify a trigger action for an operator, and may additionally specify a trigger action for one or more other affected operators. The firing of a trigger in one operator can therefore result in adjusting resources to multiple operators.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
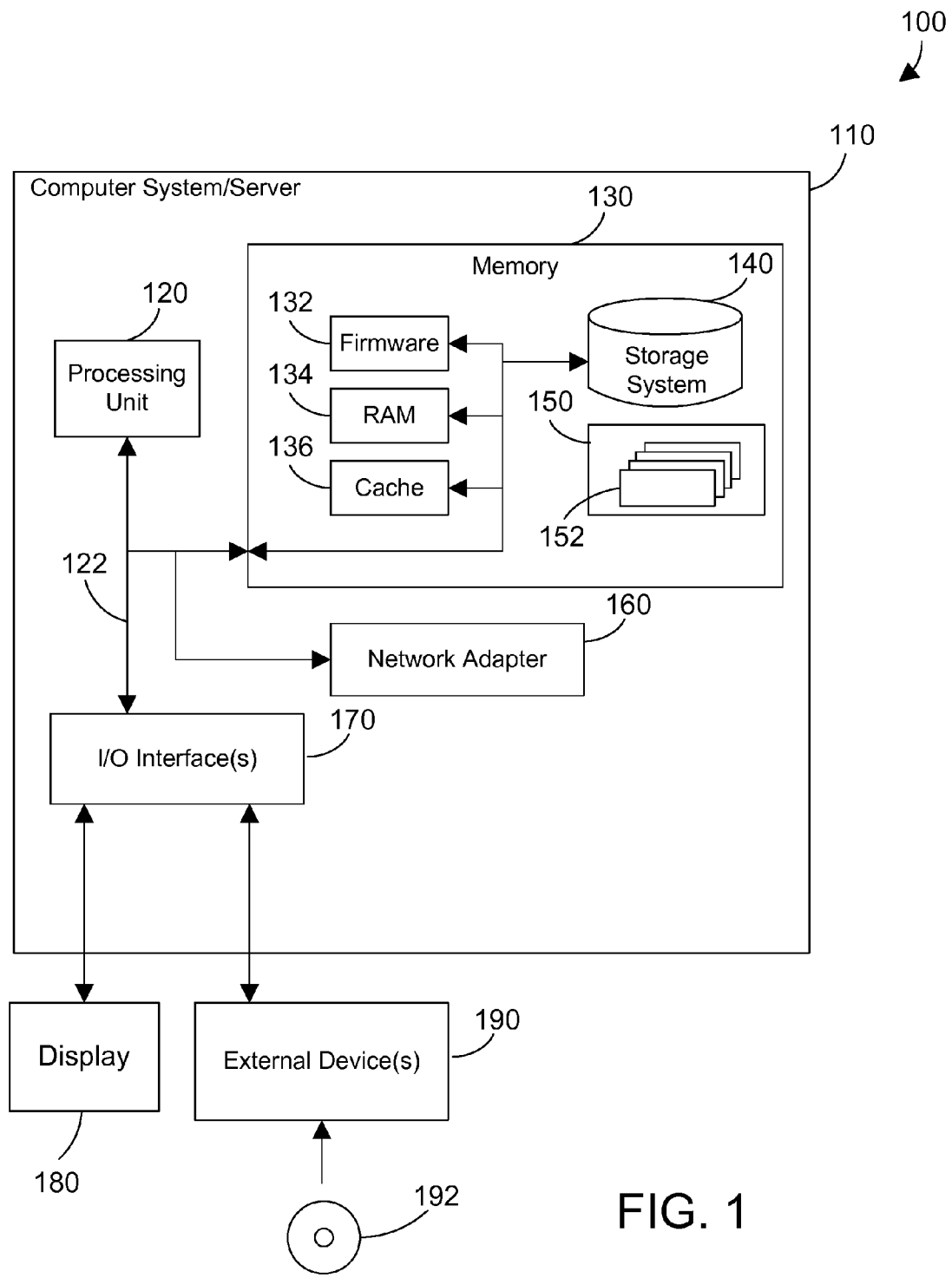
FIG. 1 is a block diagram of a cloud computing node.

The disclosure and claims herein relate to one or more operators in a flow graph of a streaming application that may include one or more triggers that indicate when action needs to be taken for the operator. A streams manager monitors performance of a streaming application and receives a notification when a trigger in an operator fires. In response to a trigger firing, the streams manager determines an appropriate action corresponding to the trigger. When the trigger indicates an adjustment of cloud resources are needed, the streams manager formulates a cloud resource request to a cloud manager. In response, the cloud manager adjusts the cloud resources for the operator to improve performance of the streaming application. A trigger may specify a trigger action for an operator, and may additionally specify a trigger action for one or more other affected operators. The firing of a trigger in one operator can therefore result in adjusting resources to multiple operators.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
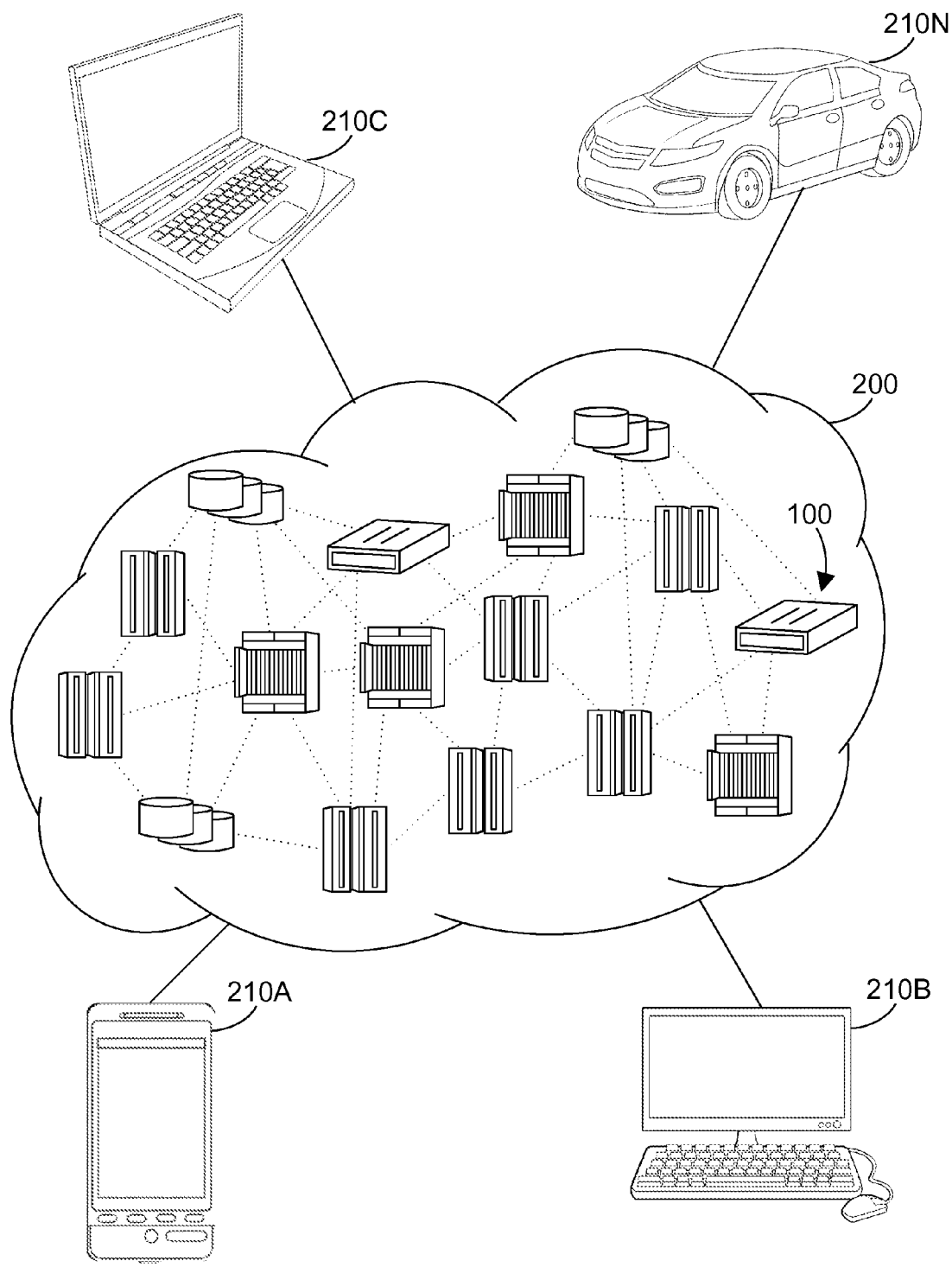
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
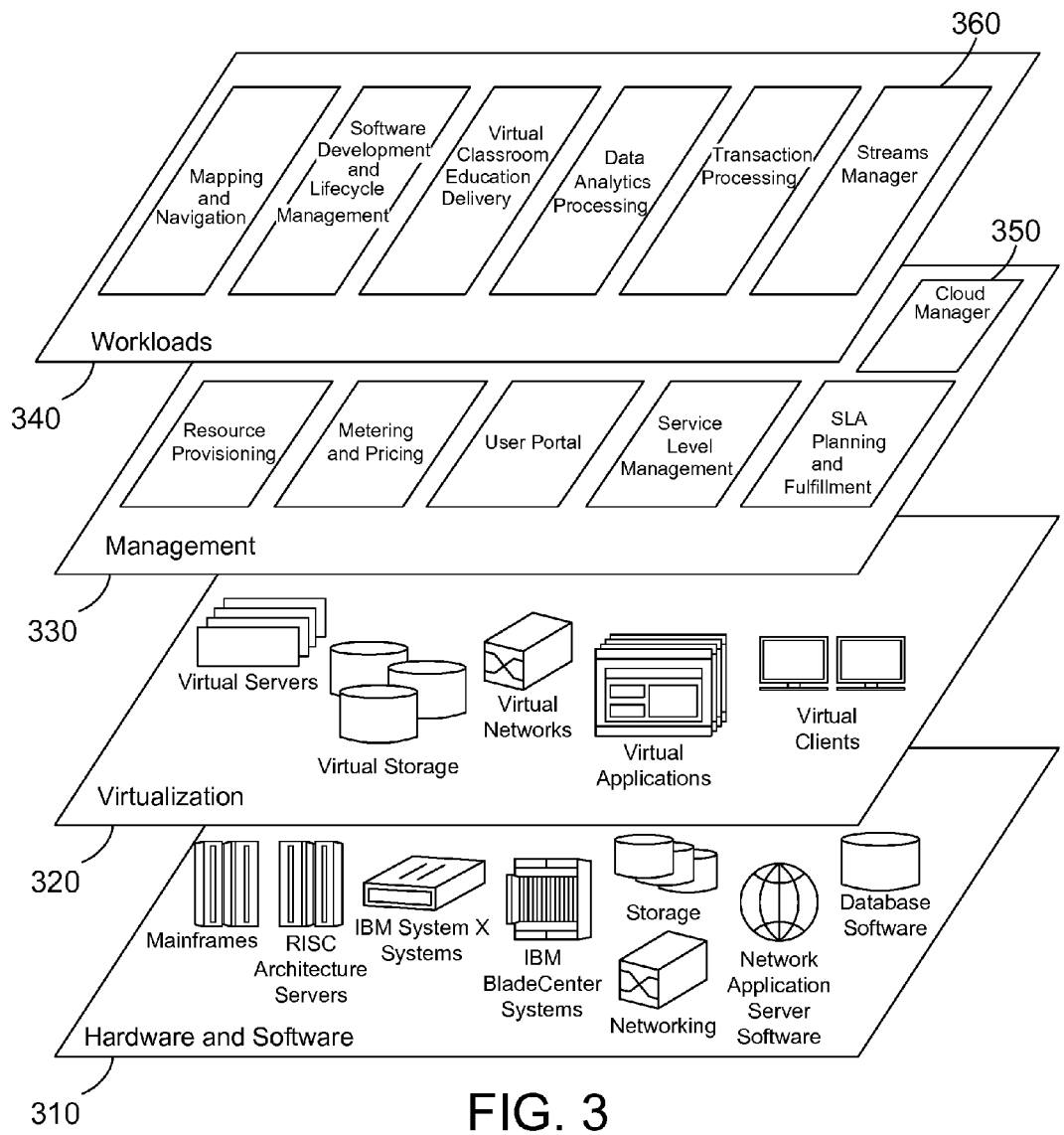
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager as described in more detail below.

While the cloud manager 350 is shown in FIG. 3 to reside in the management layer 330, cloud manager 350 can span all of the levels shown in FIG. 3, as discussed in detail below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a streams manager 360, as discussed in more detail below.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
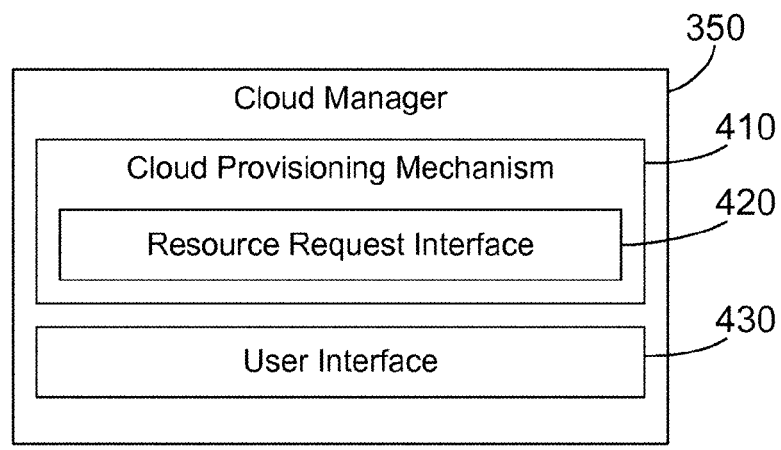
FIG. 4 is a block diagram showing some features of a cloud manager.

FIG. 4 shows one suitable example of the cloud manager 350 shown in FIG. 3. The cloud manager 350 includes a cloud provisioning mechanism 410 that includes a resource request interface 420. The resource request interface 420 allows a software entity, such as the streams manager 360, to request cloud resources from the cloud manager 350 without human intervention. The cloud manager 350 also includes a user interface 430 that allows a user to interact with the cloud manager to perform any suitable function, including provisioning resources in an existing VM, provisioning of VMs, destruction of VMs, performance analysis of the cloud, etc. The difference between the resource request interface 420 and the user interface 430 is a user must manually use the user interface 430 to perform functions specified by the user, while the resource request interface 420 may be used by a software entity to request provisioning of cloud resources by the cloud mechanism 350 without input from a human user. Of course, cloud manager 350 could include many other features and functions known in the art that are not shown in FIG. 4.

Figure 5:
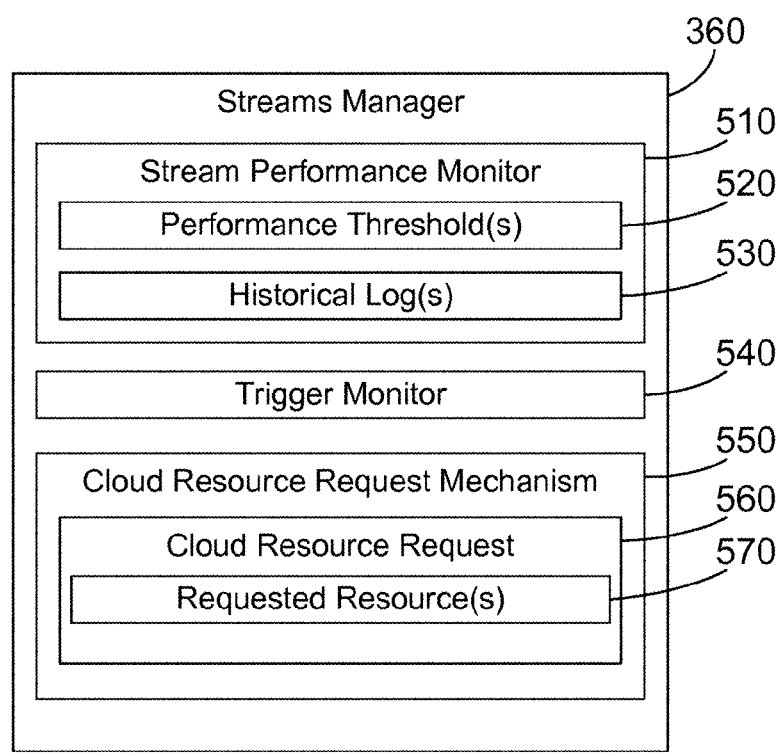
FIG. 5 is a block diagram showing some features of a streams manager.

FIG. 5 shows one suitable example of the streams manager 360 shown in FIG. 3. The streams manager 360 is software that manages one or more streaming applications, including creating operators and data flow connections between operators in a flow graph that represents a streaming application. The streams manager 360 includes a performance monitor 510, a trigger monitor 540, and a cloud resource request mechanism 550. The stream performance monitor 510 includes one or more performance thresholds 520 and one or more historical logs 530. Performance thresholds 520 can include static thresholds, such as percentage used of current capacity, and can also include any suitable heuristic for measuring performance of a streaming application as a whole or for measuring performance of one or more operators in a streaming application. Performance thresholds 520 may include different thresholds and metrics at the streams level, at the operator level, at the level of a group of operators, and/or at the level of the overall performance of the streaming application. Historical logs 530 may include past performance of operators in a streaming application. The historical logs 530 are useful in determining the conditions under which the streaming application did not perform as well as desired. The stream performance monitor 510 monitors performance of a streaming application according to the performance thresholds 520, and logs performance information for one or more operators in the historical logs 530.

The streams manager 360 also includes a trigger monitor 540. The trigger monitor 540 receives notifications when triggers within operators in a streaming application fire. In response to a trigger firing, the trigger monitor 540 determines which trigger fired, determines a corresponding action for the trigger that fired, and initiates the corresponding action. The corresponding action can include adjusting resources from a cloud manager, such as cloud manager 350 shown in FIG. 4. While the trigger monitor 540 in the streams manager 360 could receive notification of all triggers, it is equally within the scope of the disclosure and claims herein for an operator to have a trigger monitor that would cause the operator to take specified actions when a trigger for another operator fires.

The cloud resource request mechanism 550 allows the streams manager 360 to adjust cloud resources from a cloud manager without human intervention. The cloud resource request mechanism 550 allows the streams manager 360 to formulate a cloud resource request 560 that specifies requested resources 570. Requested resources 570 can include any suitable cloud resource at any suitable level of granularity, including without limitation processors (CPUs); memory; disk resources such as storage area networks (SAN), hard disk drives, solid state drives, etc.; network resources; virtual patterns that group virtual objects; virtual machines; clusters of virtual machines, etc. Note that requested resources 570 could specify additional resources that are needed, or resources that are no longer needed. When the cloud resource request 560 is submitted by the streams manager 360 to the resource request interface 420 of the cloud manager 350, the cloud manager will then process the cloud resource request without input from a human user. The result is a streams manager that detects when a trigger in an operator in a streaming application fires, and performs a corresponding action in response the trigger firing. One suitable example of a corresponding action is adjusting cloud resources used by one or more operators, as discussed in more detail below.

The cloud resource request can be formatted in any suitable way. A simple example will illustrate one suitable way for formatting a cloud resource request. Let's assume a trigger in Operator A fires. The trigger monitor 540 detects the trigger in Operator A has fired, and in response, the trigger monitor 540 determines a corresponding action to perform based on the trigger. The action could be determined based on information stored in or accessible by the streams manager 360, or could be determined by the streams manager 360 querying Operator A or the trigger that fired in Operator A to determine the corresponding action. Let's assume the trigger that fired in Operator A indicates 2 more CPUs are needed for Operator A. In response, the streams manager formulates a cloud resource request 560 that specifies two additional CPUs for Operator A as the requested resources 570. The cloud resource request mechanism 550 then submits the cloud resource request to the resource request interface 420 on the cloud manager 350. In response, the cloud manager 350 provisions two additional CPUs to the virtual machine running Operator A, thereby improving the performance of the streaming application that includes Operator A. When a trigger fires that indicates a resource is no longer required, a resource request could be formulated to the cloud manager indicating a specified resource or resources are no longer needed by an operator, which will result in the cloud manager removing the unneeded resource(s) from the operator.

Figures 6, 7, 8:
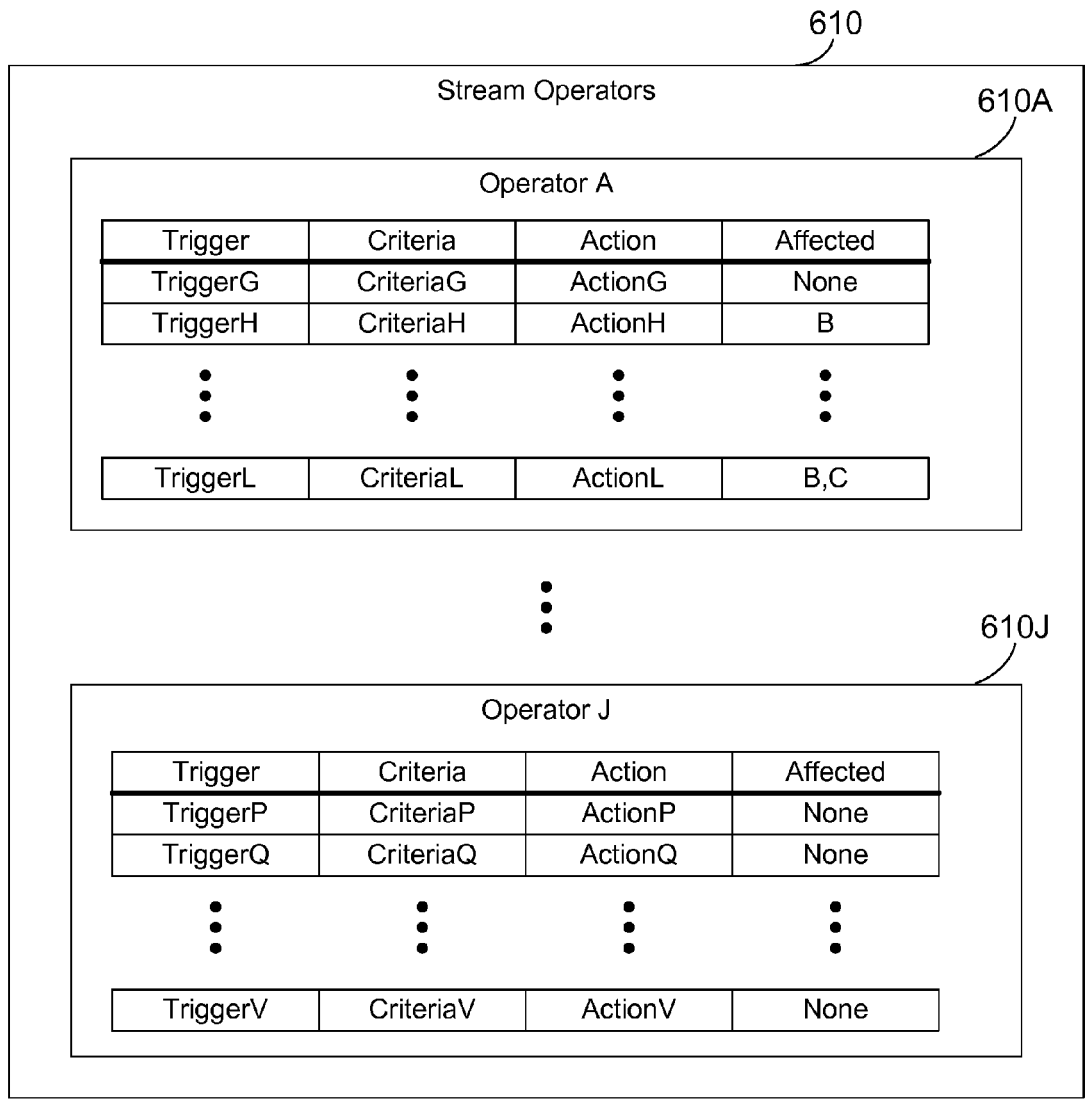
FIG. 6 is a block diagram showing triggers defined in stream operators.
FIG. 7 is a table showing some suitable examples of trigger criteria that could be specified in a trigger.
FIG. 8 is a table showing some suitable examples of trigger actions that could be specified in a trigger.

Referring to FIG. 6, a collection of stream operators 610 represent operators in a streaming application. Operators shown in FIG. 6 include Operator A 610A, . . . , Operator J 610J. One or more operators may include one or more triggers. A trigger may specify one or more trigger criteria, one or more trigger actions, and whether the trigger affects any other affected operators. An affected operator can be an upstream operator, a downstream operator, a parallel operator, or any other operator in the streaming application. For the specific examples in FIG. 6, TriggerG has a trigger criteria CriteriaG and corresponding trigger action ActionG, and does not affect any other operators. TriggerH has a trigger criteria CriteriaH and corresponding trigger action ActionH, and affects Operator B. TriggerL has a trigger criteria CriteriaL and corresponding trigger action ActionL, and affects operators B and C.

Multiple triggers are also defined for Operator J 610J in FIG. 6. TriggerP has a trigger criteria CriteriaP and corresponding trigger action ActionP, and does not affect any other operators. TriggerQ has a trigger criteria CriteriaQ and corresponding trigger action ActionQ, and does not affect any other operators. TriggerV has a trigger criteria CriteriaV and corresponding trigger action ActionV, and does not affect any other operators. The operators shown in FIG. 6 could be representative of the operators in the example streaming application shown in FIG. 12.

The trigger criteria specified in a trigger can include any suitable criteria that create a need for the operator to communicate some condition to the streams manager. Specific examples of trigger criteria as shown in FIG. 7 include resource utilization 710, data rate 720, data type 730, time-based 740, and data overflow 750. These are shown by way of example, and are not limiting. Resource utilization 710 can specify a level of resource utilization that needs to be communicated to the streams manager. For example, the trigger could specify that when the CPU utilization in an operator exceeds some defined threshold, such as 80%, the operator needs more CPUs allocated to it. Resource utilization can be specified in any suitable way, including units, thresholds, heuristics, etc. Data rate 720 can specify a data rate that needs to be communicated to the streams manager. For example, data rate 720 could specify a threshold above which a trigger will fire. Data value 730 can specify specific data values in the tuples that, when seen, will cause a trigger to fire. Data type 740 can specify a type of data that needs to be communicated to the streams manager. For example, data type 740 could specify a threshold for a particular type of data. Data type can indicate an impending need for increased resources. Time-based 750 can specify any time-based threshold, heuristic or event. For example, let's assume a streaming application that processes news feeds is busiest between the hours of 7-9 AM. Time-based 750 could specify to increase resources for an operator at 6:55 AM to prepare for the busy time between 7-9 AM. Data overflow 760 can include an overflow condition that needs to be communicated to the streams manager. For example, if an operator's buffer gets full, this means the rate of incoming tuples is greater than the operator can handle. Data overflow 760 could be indicated with respect to buffers or memory for an operator.

Trigger actions specified in a trigger can include any suitable action that needs to be performed when a trigger fires. Specific examples of trigger actions are shown in FIG. 8 to include a request adjustment of resources 810, a request for adjustment of resources for one or more other affected operators 820, live migration of an operator 830, log data 840, signal affected operator 850, and validation 860. A request for resource adjustment 810 can indicate an adjustment for any suitable resource, including CPU, memory, disk resources, and network resources. The adjustment can be increasing one or more cloud resources for an operator, or decreasing one or more cloud resources for the operator. One likely case would be increasing one or more cloud resources for an operator since a trigger could signal a need for more resources. However, a trigger could also indicate that some of the cloud resources in an operator could be released because the current load does not require those resources. A request resource adjustment for affected operator(s) 820 includes a request for any suitable adjustment for resource(s) for any affected operator. A live migration of operator 830 may be requested when resources are available on a different virtual machine. For example, when an operator needs more resources that are not available on the virtual machine on which the operator is currently running, the live migration of operator 830 will result in migrating the operator from the current virtual machine to a different virtual machine, such as one that has more available resources, one that can be deployed at less cost, etc. Log data 840 is an indication that data in the operator should be logged. This action could be specified upon detecting some condition in the operator, such as critical data or a serious error. One specific example for log data 840 is a snapshot of the virtual machine on which an operator is currently executing. Such a snapshot could then be used as a backup of the virtual machine or to debug the virtual machine. Note that log data 840 could be logged by the cloud manager, or could be logged by the streams manager. Signal affected operator 850 is an action taken by the streams manager to signal any specified operator to perform some desired function. For example, the signal affected operator 850 could cause the streams manager to signal the immediately upstream operator to slow down its tuple rate, perhaps by dropping low priority data, thereby giving the operator that had its trigger fire time to catch up. Validation 860 is action that can be taken to validate tuples. Validation 860 could thus detect attacks on the streaming application, or could detect data values that are not as expected. Validation 860 broadly extends to making sure the data tuples in the streaming application are within expected parameters. When the data tuples are not within expected parameters, the streams manager 360 can signal a problem to any suitable entity, including a human administrator and a software agent.

While there exists today different ways to adjust the performance of a streaming application, the triggers implemented in operators as disclosed herein provide a way for the operator to signal that some attention is needed dynamically as the operator performs its functions. By specifying one or more trigger criteria and one or more corresponding trigger actions for each trigger, the triggers provide a way to dynamically tune the performance of a streaming application by the operators themselves, thereby providing a highly automated solution that does not require input or analysis of a human user as the streaming application executes.

Figure 9:
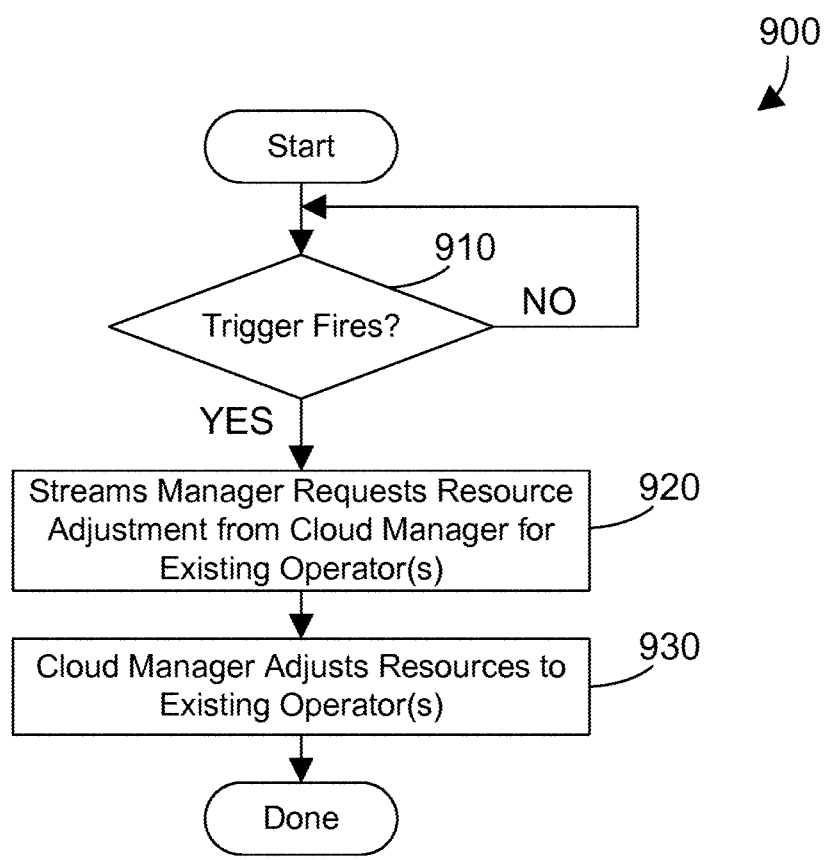
FIG. 9 is a flow diagram of a first method for processing a trigger when it fires.

Referring to FIG. 9, a method 900 shows one suitable example for increasing performance of a streaming application. When no trigger fires (step 910=NO), method 900 loops and waits until a trigger fires (step 910=YES). When the streams manager detects the trigger has fired, the streams manager requests one or more resources adjustments from the cloud manager for one or more existing operators based on the trigger (step 920). The cloud manager then adjusts the cloud resources to the one or more existing operators (step 930). Method 900 is then done.

Figure 10:
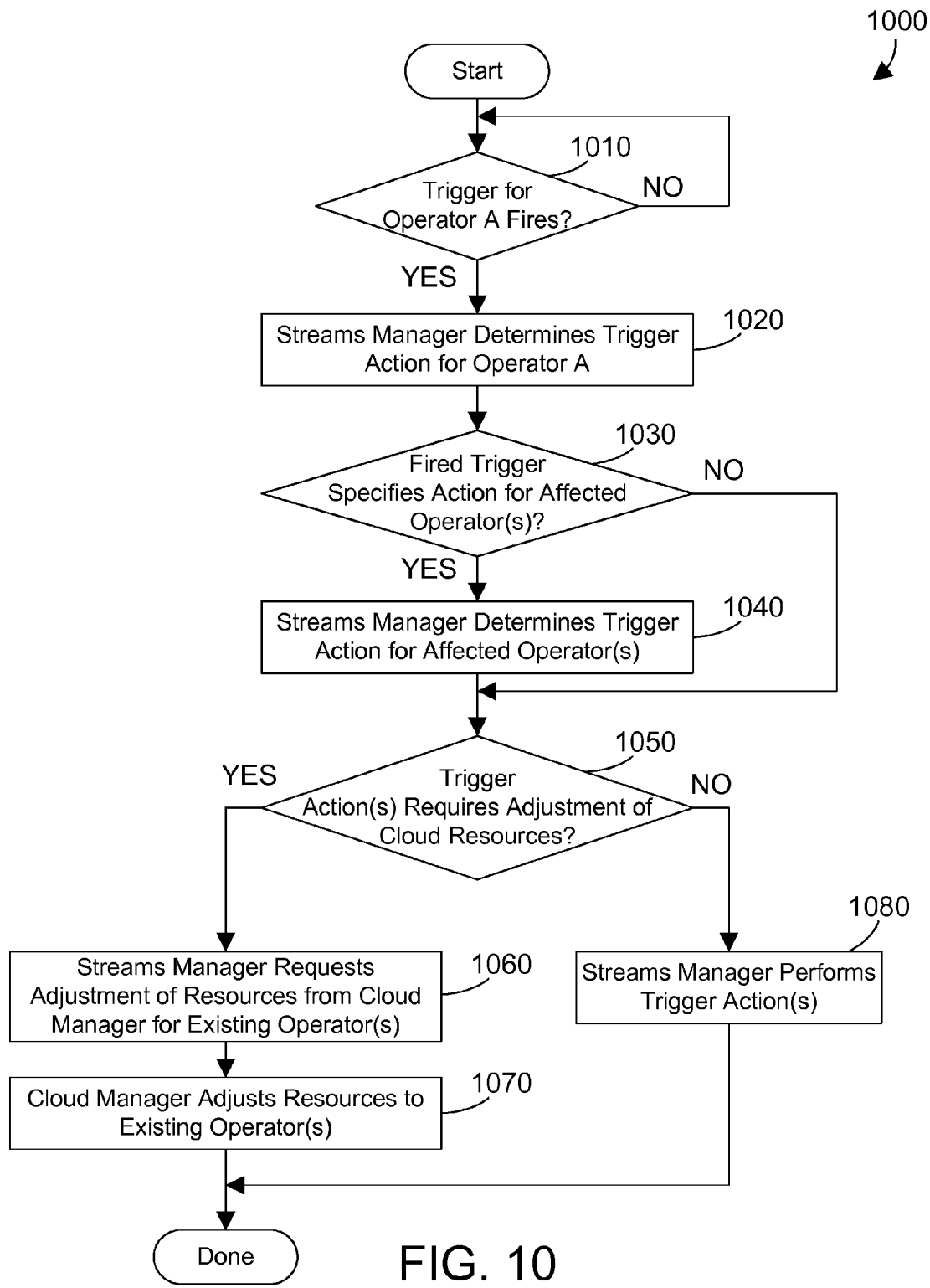
FIG. 10 is a flow diagram of a second method for processing a trigger when it fires.

FIG. 10 shows one suitable example of another method 1000 for increasing performance of a streaming application. Method 1000 waits (step 1010=NO) until a trigger for Operator A fires (step 1010=YES). The streams manager determines a trigger action for Operator A (step 1020) based on the trigger that fired. When the fired trigger specifies action for one or more other affected operators (step 1030=YES), the streams manager determines a trigger action for one or more other affected operators (step 1040). When the fired trigger does not specify action for one or more other affected operators (step 1030=NO), step 1040 is skipped. When the trigger action(s) corresponding to the fired trigger require an adjustment of cloud resources (step 1050=YES), the streams manager requests the adjustment of resources from the cloud manager for one or more existing operators (step 1060). For example, when the trigger for Operator A specifies no action for any other affected operators, the streams manager requests additional resources for the virtual machine running Operator A. When the trigger for Operator A specifies action for one or more other affected operators, the streams manager requests additional resources for the virtual machine running Operator A as well as for the virtual machine(s) running specified affected operators. In response, the cloud manager provisions additional resources to the virtual machines running the existing operators (step 1070). For example, when the trigger for Operator A specifies no action for any other affected operators, the cloud manager could provision additional resources for the virtual machine running Operator A. When the trigger for Operator A specifies action for one or more other affected operators, the cloud manager could provision additional resources for the virtual machine running Operator A as well as for the virtual machine(s) running specified affected operators. When the trigger action does not require an adjustment of cloud resources (step 1050=NO), the streams manager performs the specified trigger action(s) (step 1080). For example, when the trigger action is to log data 840 as shown in FIG. 8, the streams manager could potentially manage the logging of the data without making a request to the cloud manager. In the alternative, the streams manager could request the cloud manager to log data for the virtual machine running the operator that had a trigger fire. When the trigger action is to signal an affected operator 850 as shown in FIG. 8, the streams manager could signal an affected operator to perform some specified action. For example, the streams manager could signal an upstream operator to slow down its tuples giving the operator that had its trigger fire a chance to catch up.

Figure 11:
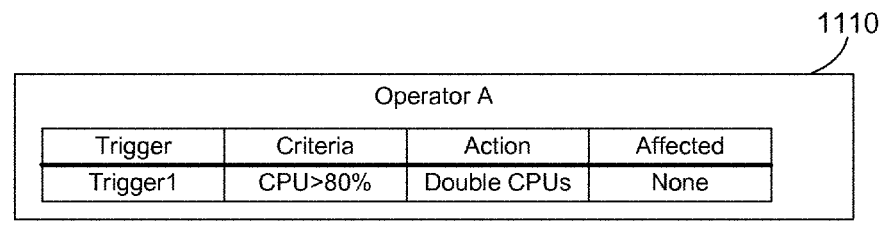
FIG. 11 is a block diagram showing a first specific example of a trigger in an operator in a streaming application.
Figure 12:
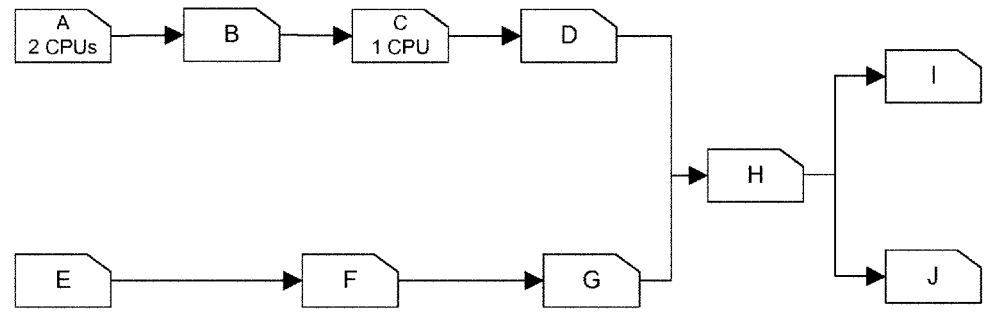
FIG. 12 is a block diagram of one specific example of a streaming application that includes operator A shown in FIG. 11.
Figure 13:
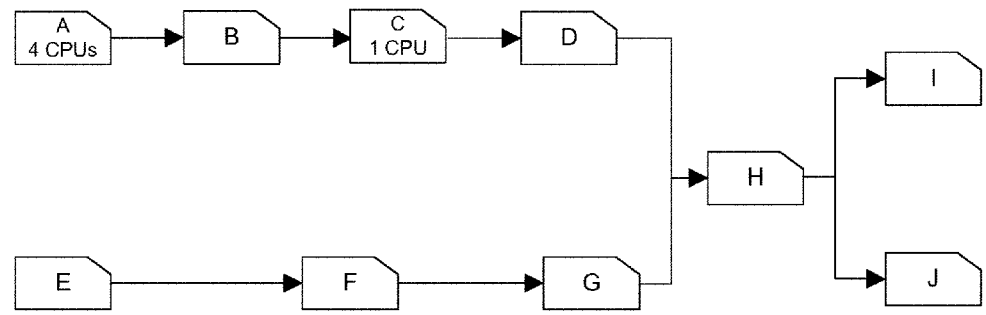
FIG. 13 is a block diagram showing the streaming application in FIG. 12 after the CPUs in operator A have increased from 2 to 4 when the trigger in FIG. 11 fires.

A simple example is provided in FIGS. 11-13 to illustrate the concepts discussed above. Referring to FIG. 11, an operator A 1110 includes a trigger called Trigger1 as shown that specifies a trigger criteria of CPU threshold of 80% with a corresponding trigger action to double the number of CPUs for Operator A, with no action needed for any other affected operators. Operator A 1110 is one suitable example for Operator A 610A shown in FIG. 6. FIG. 12 shows one specific example of a streaming application that includes operators A, B, C, D, E, F, G, H, I and J as shown. Operator A originates a stream of tuples, which is processed by operator B, which outputs tuples. The tuples from operator B are processed by operator C, which outputs tuples to operator D, which processes the tuples and outputs its tuples to operator H. In similar fashion, operator E originates a stream of tuples, which is processed by operator F, which outputs tuples that are processed by operator G, which outputs tuples to operator H. Note that operator H receives tuples from both operator D and operator G. Operator H processes the tuples it receives from operator D and from operator G, and outputs its tuples to operators I and J. Note that Operator A in FIG. 12 initially includes two CPUs.

We now assume the load on Operator A increases until CPU utilization exceeds 80%, which causes Trigger1 in FIG. 11 to fire. The trigger monitor 540 in the streams manager 360 detects when Trigger1 fires, and determines a corresponding trigger action for Trigger1. As stated above, the trigger monitor 540 could determine the corresponding trigger action for a fired trigger by reading any suitable data source, including a local data source, a remote data source, or by querying Operator A. The corresponding trigger action shown in FIG. 11 for Trigger1 is to double the number of CPUs for Operator A. Because Operator A has two CPUs as shown in FIG. 12, the cloud resource request mechanism 550 in the streams manager 360 generates cloud resource request 560 that specifies two additional CPUs for Operator A as the requested resource(s) 570. This cloud resource request is submitted by the streams manager 360 to the cloud manager 350, resulting in the cloud manager increasing the number of CPUs for the virtual machine running Operator A from two to four, as shown in FIG. 13. This simple example shows how a trigger internal to an operator can result in automatically requesting and receiving additional resources dynamically as needed.

Figure 14:
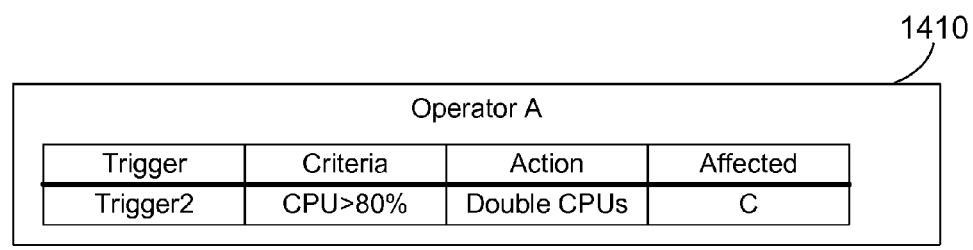
FIG. 14 is a block diagram showing a second specific example of a trigger in an operator in a streaming application that includes specifying an affected operator.

In a second example, Operator A includes a trigger called Trigger2 as shown in FIG. 14. This is similar to Trigger1 shown in FIG. 11 for the trigger criteria and trigger action, but Trigger2 has an effect on another operator, while Trigger1 does not. Trigger2 indicates an effect on an affected operator C.

Figure 15:
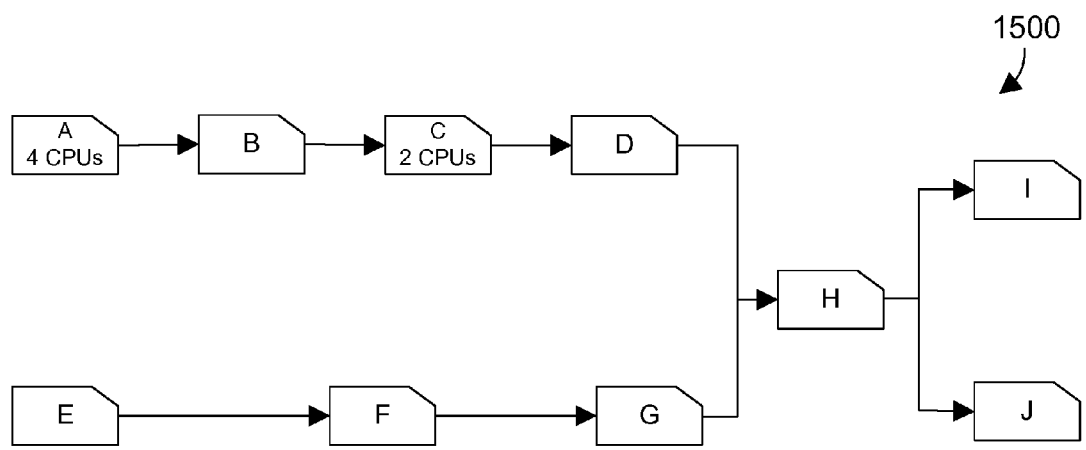
FIG. 15 is a block diagram showing the streaming application in FIG. 12 after the CPUs in operator A have increased from 2 to 4 and the CPUs in operator C have increased from 1 to 2 when the trigger in FIG. 14 fires.

We assume the same starting point for the streaming application shown in FIG. 12. We now assume the load on Operator A increases until CPU utilization exceeds 80%, which causes Trigger2 in FIG. 14 to fire. The trigger monitor 540 in the streams manager 360 detects when Trigger2 fires, and determines a corresponding trigger action for Trigger2. The corresponding trigger action shown in FIG. 14 for Trigger2 is to double the number of CPUs. Because the affected operator C is specified in Trigger2, the number of CPUs will be doubled in both Operator A and in Operator C even though no trigger fired in Operator C. A user could determine based on historical logs (such as 530 in FIG. 5) that an increase in the load on Operator A will cause a corresponding increase on Operator C, and can thus specify in a trigger for Operator A to increase CPUs for both Operator A and Operator C when Trigger2 fires. Because Operator A has two CPUs as shown in FIG. 12, the cloud resource request mechanism 550 in the streams manager 360 generates a cloud resource request 560 that specifies two additional CPUs as the requested resource(s) 570 for Operator A. This cloud resource request is submitted by the streams manager 360 to the cloud manager 350, resulting in the cloud manager increasing the number of CPUs for the virtual machine running Operator A from two to four, as shown in FIG. 15. In addition, the cloud resource request mechanism 550 in the streams manager 360 generates a second cloud resource request 560 that specifies one additional CPU as the requested resource 570 for Operator C. This cloud resource request is submitted by the streams manager 360 to the cloud manager 350, resulting in the cloud manager increasing the number of CPUs for the virtual machine running Operator C from one to two, as shown in FIG. 15. This simple example shows how a trigger internal to an operator can result in automatically requesting and receiving additional resources dynamically for both that operator and one or more other affected operators as needed.

In Trigger2 shown in FIG. 14, the same trigger action is taken for Operator A and for all other affected operators that are specified, in this case, Operator C. Thus, the number of CPUs for Operator A and Operator C are both doubled when Trigger2 fires, as shown in FIG. 15. Note, however, a trigger could specify a different action for different affected operators. This allows customizing a trigger based on data in historical logs or user preference so the trigger can automate performance enhancements for a streaming application by specifying different actions for different operators that are all performed when the trigger fires. Thus, a trigger could be defined that, when fired, results in doubling the number of CPUs for Operator A, that doubles the amount of memory for Operator B, and that doubles the network resources connecting Operator B to Operator C. The disclosure and claims herein expressly extend to specifying in a trigger any suitable action or combination of actions for any affected operator or combination of affected operators.

The streaming application disclosed and claimed herein provides an incredibly powerful and flexible way to improve the performance of a streaming application. Operators in a streaming application can include internal triggers that, when fired, can result in automatically increasing cloud resources for the operators without any analysis or intervention by a human operator. This provides a very powerful and cost-effective solution to running streaming applications.

The disclosure and claims herein relate to one or more operators in a flow graph of a streaming application that may include one or more triggers that indicate when action needs to be taken for the operator. A streams manager monitors performance of a streaming application and receives a notification when a trigger in an operator fires. In response to a trigger firing, the streams manager determines an appropriate action corresponding to the trigger. When the trigger indicates an adjustment of cloud resources are needed, the streams manager formulates a cloud resource request to a cloud manager. In response, the cloud manager adjusts the cloud resources for the operator to improve performance of the streaming application. A trigger may specify a trigger action for an operator, and may additionally specify a trigger action for one or more other affected operators. The firing of a trigger in one operator can therefore result in adjusting resources to multiple operators.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a streaming application residing in the memory and executed by the at least one processor, the streaming application comprising a flow graph that includes a plurality of operators that process a plurality of data tuples;
   a trigger in a first of the plurality of operators that specifies:
      trigger criteria that includes data overflow of a memory of the first operator;
      a corresponding trigger action to perform that comprises logging a snapshot of a virtual machine when the trigger fires due to the data overflow of the memory in the first operator; and
      an affected operator that is affected by the processing in the first operator by being upstream or downstream from the first operator; and
   a streams manager residing in the memory and executed by the at least one processor, the streams manager receiving notification when the trigger fires, determining the corresponding trigger action, and initiating at least one operation to perform the corresponding trigger action, wherein the initiation of the at least one operation comprises submitting a first request to a cloud manager to provision additional resources for a first virtual machine running the first operator and submitting a second request to the cloud manager to provision additional resources for a second virtual machine separate from the first virtual machine, wherein the second virtual machine runs the affected operator specified in the trigger.

2. The apparatus of claim 1 wherein the at least one operation comprises a first request to a cloud manager to perform live migration of the operator to a different virtual machine.

3. The apparatus of claim 1 wherein the at least one operation comprises a request to log a snapshot of a first virtual machine running the first operator.

4. The apparatus of claim 1 wherein the trigger criteria includes utilization of at least one resource in a first virtual machine running the first operator.

5. The apparatus of claim 1 wherein the trigger criteria includes data rate of tuples received by the first operator.

6. The apparatus of claim 1 wherein the trigger criteria includes data type of tuples received by the first operator.

7. The apparatus of claim 1 wherein the trigger criteria comprises a usage threshold and the corresponding trigger action comprises doubling a number of resources in the first virtual machine running the first operator and doubling a number of resources in the second virtual machine running the affected operator.

8. The apparatus of claim 7 wherein the resources comprise CPUs.

9. An article of manufacture comprising software stored on a non-transitory storage medium, the software comprising:
   a streams manager running a streaming application comprising a flow graph that includes a plurality of operators that process a plurality of data tuples;
   a trigger in a first of the plurality of operators that specifies:
      trigger criteria that includes data overflow of a memory of the first operator;
      a corresponding trigger action to perform that comprises logging a snapshot of a virtual machine when the trigger fires due to the data overflow of the memory in the first operator; and
      an affected operator that is affected by the processing in the first operator by being upstream or downstream from the first operator; and
   the streams manager receiving notification when the trigger fires, determining the corresponding trigger action, and initiating at least one operation to perform the corresponding trigger action, wherein the initiation of the at least one operation comprises submitting a first request to a cloud manager to provision additional resources for a first virtual machine running the first operator and submitting a second request to the cloud manager to provision additional resources for a second virtual machine separate from the first virtual machine, wherein the second virtual machine runs the affected operator specified in the trigger.

10. The article of manufacture of claim 9 wherein the at least one operation comprises a first request to a cloud manager to perform live migration of the operator to a different virtual machine.

11. The article of manufacture of claim 9 wherein the at least one operation comprises a request to log a snapshot of a first virtual machine running the first operator.

12. The article of manufacture of claim 9 wherein the trigger criteria includes utilization of at least one resource in a first virtual machine running the first operator.

13. The article of manufacture of claim 9 wherein the trigger criteria includes data rate of tuples received by the first operator.

14. The article of manufacture of claim 9 wherein the trigger criteria includes data type of tuples received by the first operator.

15. The article of manufacture of claim 9 wherein the trigger criteria comprises a usage threshold and the corresponding trigger action comprises doubling a number of resources in the first virtual machine running the first operator and doubling a number of resources in the second virtual machine running the affected operator.

16. The article of manufacture of claim 15 wherein the resources comprise CPUs.

17. An apparatus comprising:
   at least one processor;
   a memory coupled to the at least one processor;
   a streaming application residing in the memory and executed by the at least one processor, the streaming application comprising a flow graph that includes a plurality of operators that process a plurality of data tuples;
   a trigger in a first of the plurality of operators that specifies:
      trigger criteria comprising:
         utilization of at least one resource in a first virtual machine running the first operator;
         data rate of tuples received by the first operator;
         data value of tuples received by the first operator;
         data type of tuples received by the first operator;
         time-based criteria; and
         data overflow of a memory in the first operator;
      a plurality of corresponding trigger actions to perform when the trigger fires due to the trigger criteria being satisfied;
      an affected operator that is affected by the processing in the first operator by being upstream or downstream from the first operator;
   a streams manager residing in the memory and executed by the at least one processor, the streams manager detecting when the trigger fires due to the trigger criteria being satisfied, and in response to detecting when the trigger fires, determining the plurality of corresponding trigger actions, wherein plurality of the corresponding trigger actions comprises:

submitting a first request to a cloud manager to provision additional resources for a first virtual machine running the first operator;

submitting a second request to the cloud manager to provision additional resources for a second virtual machine separate from the first virtual machine, wherein the second virtual machine runs the affected operator specified in the trigger;

submitting a first request to a cloud manager to perform live migration of the first operator to a different virtual machine;

logging a snapshot of a first virtual machine running the first operator;

logging a second snapshot of a second virtual machine running the affected operator specified in the trigger; and initiating at least one operation to perform the plurality of corresponding trigger actions.

* * * * *